D. Oliver.
Hedge Trimmer.
No. 99,938.  Patented. Feb. 15, 1870.
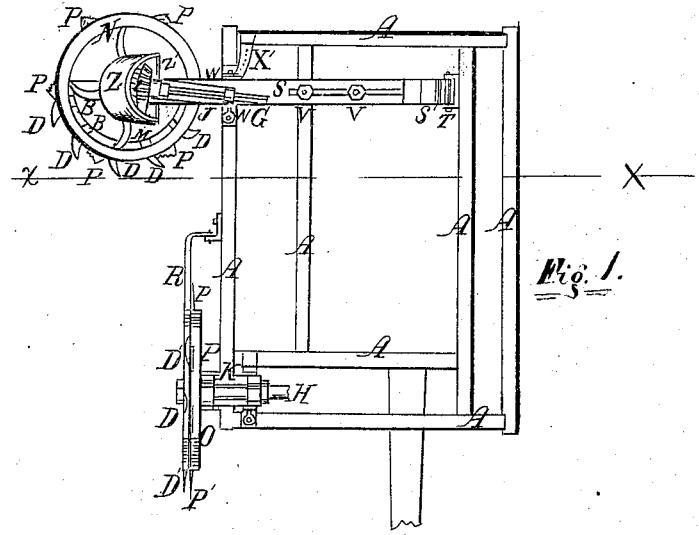
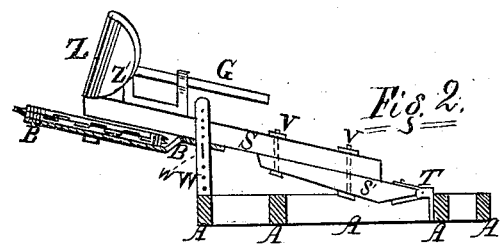
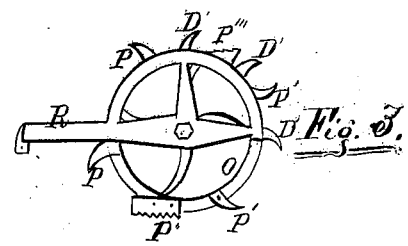
Witnesses:
J. B. Harsh
Platt D. Richards
Inventor,
David Oliver
per W. B. Richards,
Atty

United States Patent Office.

DAVID OLIVER, OF GALESBURG, ILLINOIS.

Letters Patent No. 99,938, dated February 15, 1870.

IMPROVEMENT IN HEDGE-TRIMMERS.

The Schedule referred to in these Letters Patent and making part of the same.

To all whom it may concern:

Be it known that I, DAVID OLIVER, of Galesburg, in the county of Knox, and State of Illinois, have invented certain Improvements in Hedge-Cutting Machines, of which the following is a specification.

Nature and Objects of the Invention.

The nature of my invention relates to improvements on a hedge-cutting machine, for which I obtained Letters Patent of the United States No. 53,033, bearing date March 6, 1866; and The invention consists—

First, in supporting the cutter-wheel N in the old patent, and the device for operating the same on a sliding and slotted bar, by means of which said wheel may be set further from or nearer to the main frame, as desired.

Secondly, it consists in a device for regulating the slope or inclination of said bar, and thus regulating the slope of the cutter-wheel.

Thirdly, it consists in combining a guard with the gear-wheels over the cutter-wheel N to keep off the cuttings.

Fourthly, it consists in the use of sickle-toothed knives on the cutter-wheel N.

Fifthly, it consists in the use of saw-toothed knives or of sickle-toothed knives on the cutter-wheel marked O in the old patent.

Description of the Accompanying Drawings.

Figure 1 is a top plan or view of my improvement.

Figure 2 is a transverse vertical section on the plane of the line x x, fig. 1.

Figure 3 is a side elevation of the cutter-wheel O of fig. 1 and the guard R.

General Description.

A is the frame of the machine, which differs in no essential particular from my old patent.

G is the shaft through which motion is transmitted from the wheels to the rear cutter, same as in my patent of March 6, 1866.

L and M is the gear and N the cutter-wheel, same as in said patent, except the cutters proper, as hereafter described.

S is a bar carrying on its outer end the cutter-wheel N and shaft G and gear L M. This bar is slotted, as shown, at its inner end, and provided with bolts and nuts V V, by means of which it may be secured to bar S', and also by means of which it may be extended or contracted for the purpose of bringing the cutter-wheel N further from or closer to the main frame.

W W are uprights provided with a series of holes, as shown, through which a pin, W', may be inserted for supporting the bar S at any desired height, and giving the desired inclination to the cutter-wheel N, the bar S' being pivoted at T to allow of this vertical movement or adjustment.

X' is a brace extending from the frame A to the top of the upright W, and having a series of holes through which a lever may be run for the purpose of holding and raising the bar S for adjustment.

Z is a guard for the purpose of protecting the gear L M from the cuttings, and is pivoted by a bolt or pin, Z', to the bearing for the shaft G, so it may be thrown over out of the way for oiling the gearing or other purposes.

P P P are triangular-shaped knives with sickle-toothed edges projecting from the periphery of the cutter-wheel N in the same position as the plain cutters in my old patent, and designed to render more certain the operation of cutting large stocks or old, hard and dry ones.

P'', fig. 3, represents a rectangular tooth or cutter with a saw-tooth edge tangent to the cutter-wheel O, to which it is attached, and P''' is a triangular sickle-toothed cutter attached to the same wheel O. These teeth with the serrated edges are attached to the cutter the same and operate with the teeth or cutters on the guard R the same as in my old patent.

Claims.

I claim as my invention—

1. The combination and arrangement of the bars S and S' and bolts V V and cutter-wheel N, substantially as described and for the purpose set forth.

2. The arrangement of the uprights W W, brace X' and bars S S', substantially as described and for the purpose set forth.

3. The guard Z pivoted at Z', as and for the purpose described.

4. The sickle-toothed knives P, when attached to a rotary cutter and operating with the knives D D, substantially as described and for the purpose set forth.

5. The serrated-edged knives P'' P''' combined with the forward cutter-wheel O and guard R, in the manner substantially as described and for the purpose set forth.

DAVID OLIVER.

Witnesses:
J. B. HARSH,
M. V. DREW.